(12) United States Patent
Canelle et al.

(10) Patent No.: US 11,952,901 B2
(45) Date of Patent: Apr. 9, 2024

(54) TURBOMACHINE SEALING RING

(71) Applicant: SAFRAN AIRCRAFT ENGINES, Paris (FR)

(72) Inventors: Etienne Gérard Joseph Canelle, Moissy-Cramayel (FR); Jacques Marcel Arthur Bunel, Moissy-Cramayel (FR); Bruno Giardini, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/642,019

(22) PCT Filed: Sep. 11, 2020

(86) PCT No.: PCT/FR2020/051570
§ 371 (c)(1),
(2) Date: Mar. 10, 2022

(87) PCT Pub. No.: WO2021/048505
PCT Pub. Date: Mar. 18, 2021

(65) Prior Publication Data
US 2023/0175412 A1    Jun. 8, 2023

(30) Foreign Application Priority Data

Sep. 13, 2019 (FR) .................................. 1910134

(51) Int. Cl.
*F01D 11/00* (2006.01)
*F01D 11/12* (2006.01)

(52) U.S. Cl.
CPC ............ *F01D 11/12* (2013.01); *F01D 11/001* (2013.01); *F01D 11/003* (2013.01);
(Continued)

(58) Field of Classification Search
CPC ...... F01D 11/12; F01D 11/001; F01D 11/003; F01D 11/005; F05D 2220/32; F05D 2240/55
See application file for complete search history.

(56) References Cited

U.S. PATENT DOCUMENTS

| | | | | |
|---|---|---|---|---|
| 4,767,267 A | * | 8/1988 | Salt ..................... | F01D 11/025 415/174.4 |
| 8,100,644 B2 | * | 1/2012 | Hazevis ............... | F01D 11/005 415/173.1 |

(Continued)

FOREIGN PATENT DOCUMENTS

| | | |
|---|---|---|
| EP | 3 095 958 A1 | 11/2016 |
| FR | 3 058 458 A1 | 5/2018 |
| WO | 2015/084550 A1 | 6/2015 |

OTHER PUBLICATIONS

English translation of Written Opinion dated Nov. 11, 2020, issued in corresponding International Application No. PCT/FR2020/051570, filed Sep. 11, 2020, 4 pages.

(Continued)

*Primary Examiner* — Courtney D Heinle
*Assistant Examiner* — Theodore C Ribadeneyra
(74) *Attorney, Agent, or Firm* — CHRISTENSEN O'CONNOR JOHNSON KINDNESS PLLC

(57) ABSTRACT

A turbomachine sealing ring has an axis of revolution and includes an annular support, an annular coating made of abradable material which is carried by the support, and an annular thermal protection plate which is carried by the support. The ring is divided into sectors and has a plurality of ring sectors disposed circumferentially next to one another about the axis. Each ring sector has a support sector, a coating sector, and a plate sector. Each plate sector ling includes a flat tab that is pressed against a face of the corresponding support sector and is fixed to this face by (Continued)

brazing. The tab is inserted into a through-slot in the support sector in order to improve its integrity in operation.

13 Claims, 6 Drawing Sheets

(52) U.S. Cl.
CPC ........ *F01D 11/005* (2013.01); *F05D 2220/32* (2013.01); *F05D 2240/55* (2013.01)

(56) References Cited

U.S. PATENT DOCUMENTS

| | | | |
|---|---|---|---|
| 8,961,117 B2* | 2/2015 | Garin | F01D 11/005 |
| | | | 415/177 |
| 9,238,977 B2* | 1/2016 | Albers | F01D 5/12 |
| 9,828,879 B2* | 11/2017 | Sluyter | F01D 9/04 |
| 9,932,901 B2* | 4/2018 | Sener | F01D 11/16 |
| 10,655,495 B2* | 5/2020 | Groves, II | F01D 25/12 |
| 10,662,794 B2* | 5/2020 | Das | F01D 11/001 |
| 10,982,559 B2* | 4/2021 | Filippi | F01D 11/005 |
| 11,035,244 B2* | 6/2021 | Morliere | F01D 11/005 |
| 11,402,097 B2* | 8/2022 | Stieg | F23R 3/007 |
| 11,608,752 B2* | 3/2023 | Farmer | F01D 11/005 |
| 2005/0002779 A1 | 1/2005 | Tanaka | |
| 2015/0118035 A1* | 4/2015 | Gendraud | F01D 11/005 |
| | | | 415/191 |
| 2015/0354381 A1* | 12/2015 | Congratel | F01D 21/045 |
| | | | 29/889.22 |
| 2015/0377044 A1* | 12/2015 | Congratel | F01D 9/02 |
| | | | 29/889.22 |
| 2016/0003081 A1* | 1/2016 | Broomer | F01D 9/02 |
| | | | 415/173.1 |
| 2016/0024952 A1* | 1/2016 | Farah | F02C 7/28 |
| | | | 415/208.1 |
| 2016/0032746 A1* | 2/2016 | Jenkins | F01D 9/041 |
| | | | 415/173.1 |
| 2016/0281531 A1* | 9/2016 | Dube | F01D 11/001 |
| 2020/0018182 A1* | 1/2020 | Whitaker | F01D 9/041 |

OTHER PUBLICATIONS

International Preliminary Report on Patentability dated Mar. 15, 2022, issued in corresponding International Application No. PCT/FR2020/051570, filed Sep. 11, 2020, 6 pages.
International Search Report dated Nov. 11, 2020, issued in corresponding International Application No. PCT/FR2020/051570, filed Sep. 11, 2020, 5 pages.
Written Opinion dated Nov. 11, 2020, issued in corresponding International Application No. PCT/FR2020/051570, filed Sep. 11, 2020, 5 pages.

* cited by examiner

TURBOMACHINE SEALING RING

FIELD OF THE DISCLOSURE

The present disclosure relates to a turbomachine sealing ring, and in particular, for a turbomachine turbine.

BACKGROUND

The technical background comprises, in particular, the documents FR-A1-3 058 458, EP-A1-3 095 958, EP-A1-3 090 138 and US-A2-2005/002779.

A turbomachine turbine comprises one or more stages each comprising a nozzle formed by an annular row of fixed blades carried by a casing of the turbine, and a blade wheel mounted for rotation generally downstream of the nozzle. The wheel is surrounded by a turbomachine sealing ring which is sectorised and formed by sectors which are arranged circumferentially end to end and which are fastened to the casing of the turbine. Each ring sector typically comprises an annular support which carries an annular coating made of abradable material fastened to the inner surface of the support. This coating is for example of the honeycomb type and is intended to rub against outer annular lips on the blades of the wheel to form a labyrinth seal and minimise radial clearances between the wheel and the ring sectors.

Each ring sector comprises at its upstream and downstream axial ends fastening elements to the casing. Each ring sector may comprise at its upstream end a circumferential rim for fastening by hooking to the casing of the turbine.

In the present application, the terms "upstream" and "downstream" refer to the flow of gases in the turbomachine, and for example to the combustion gases in the turbine duct of the turbomachine.

During operation, the casing of the turbine is exposed to very high temperatures that can affect its life. To limit the impact of these temperatures on the casing, it is known to protect it with heat shields which generally serve as deflectors, thus avoiding a direct impact on the casing of the hot gas flowing in the duct of the turbine.

FIGS. 1 to 3 illustrate the example of a thermal protection plate 10 carried by a turbomachine sealing ring 12 of a turbine 14 of a turbomachine and protecting a part 16a of a casing 16 of this turbine. FIGS. 2 and 3 show a ring sector 18 which comprises a support sector 20, an abradable coating sector 22 and a plate sector 24.

The plate sector 24 extends the full circumferential extent of the support sector and is fastened to the latter by brazing. FIG. 3 shows the brazing area 26 of the plate sector 24 on one side 28 of the support sector 20. This area 26 extends over the entire circumferential extent of the plate sector 24.

In operation, crack initiation may occur at the circumferential ends of the plate sector 24. They can spread and lead to the detachment of plate pieces into the turbine duct. The high stresses on the brazed joint and the plate sector itself at these ends are mainly due to the temperature gradients between the different areas and the difference in the coefficient of expansion between the support and plate materials.

A simple, effective and economical solution was therefore sought to improve the performance of this type of plate.

SUMMARY

The present disclosure relates to a turbomachine sealing ring, having an axis of revolution and comprising:

- an annular support which comprises fastening elements and/or hooking elements configured to cooperate with a stator element of the turbomachine,
- an annular coating made of abradable material which is carried by the support, and
- an annular thermal protection plate which is carried by the support, the ring being sectorised and comprising a plurality of ring sectors arranged circumferentially next to one another about the axis, each ring sector comprising a support sector, a coating sector and a plate sector, each plate sector comprising a flat tab pressed against a face of the corresponding support sector and fixed to this face by brazing, characterised in that the tab is inserted into a through-slot in the support sector in order to improve its integrity in operation.

The plate sector, in addition to being brazed to the support sector, is thus engaged in a slot of the support sector. The tab of the plate sector is brazed to the face of the support sector and can also be brazed into the slot of the support sector. The brazing and insertion of the tab improves its mechanical integrity in operation and limits the risk of accidental detachment of the plate.

The ring according to the disclosure may comprise one or more of the following features, taken in isolation from each other or in combination with each other:

- the support comprises a first annular wall extending substantially perpendicular to the axis and the outer periphery of which is connected to a second cylindrical or frustoconical wall to which the coating is fixed, and the inner periphery of which is connected to a cylindrical fastening rim, the tab of each plate sector being applied against a free face, preferably downstream, of a sector of the first wall and inserted in a through-slot in the second wall of a sector;
- the plate is generally S-shaped in axial section and comprises a median annular wall connected to two annular rims extending substantially in parallel in opposite directions, the tab of each plate sector extending in the continuation of one of the rims of that plate sector;
- the median wall of the plate extends away from and within the fastening rim of the support;
- the circumferential ends at the connection of the tab to the plate sector are arranged to limit the risk of stress concentration in operation;
- the face of the support sector comprises a groove which extends tangentially or circumferentially with respect to the axis and which is covered by the tab and/or by the strip of material, this groove being configured to limit the spread of braze when fastening the plate sector to the support sector;
- the tab of each plate sector has a generally rectangular in shape and has a circumferential extent around the axis representing at most 30% of the circumferential extent of the plate sector;
- the slot of each support sector has a general circumferential orientation around the axis and has a circumferential extent representing at most 30% of the circumferential extent of the support sector;
- the coating bears on or brazed to the tab of each plate sector; and
- the stator element is a casing and/or a nozzle.

The present disclosure also relates to a turbomachine, comprising at least one sealing ring as described above, in particular in a turbine.

DESCRIPTION OF THE DRAWINGS

The disclosure will be better understood and further details, features and advantages of the disclosure will become apparent from the following description made by way of non-limiting example and with reference to the attached drawings, in which.

DETAILED DESCRIPTION

Figure 1:
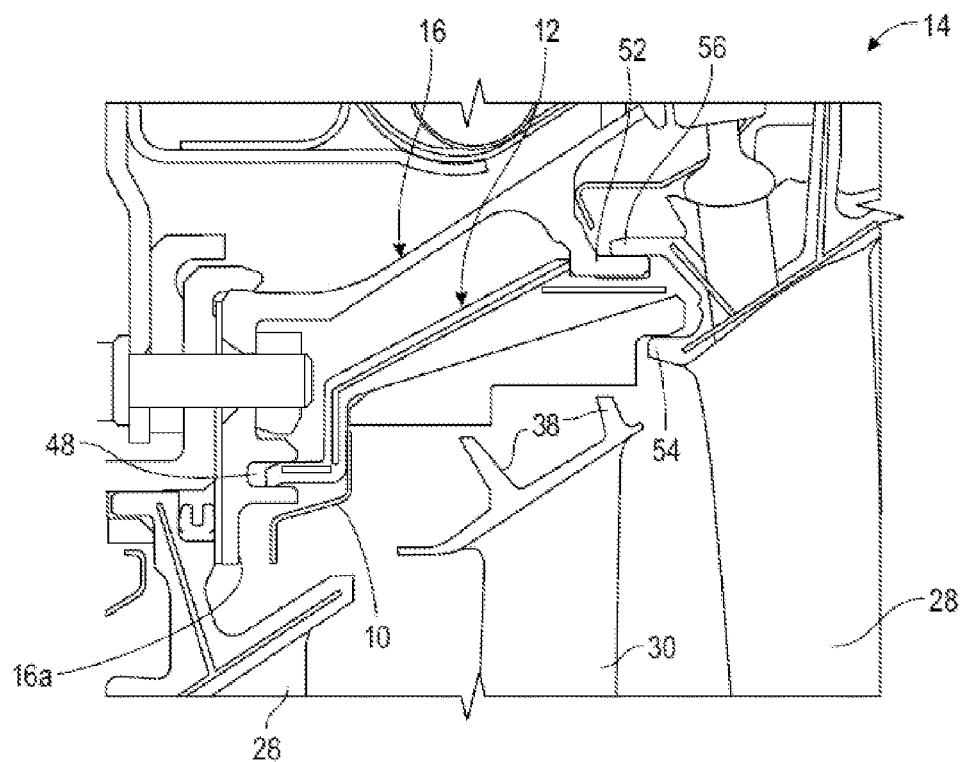
FIG. 1 is a partial schematic half-view in axial section of a turbomachine turbine.
Figure 2:
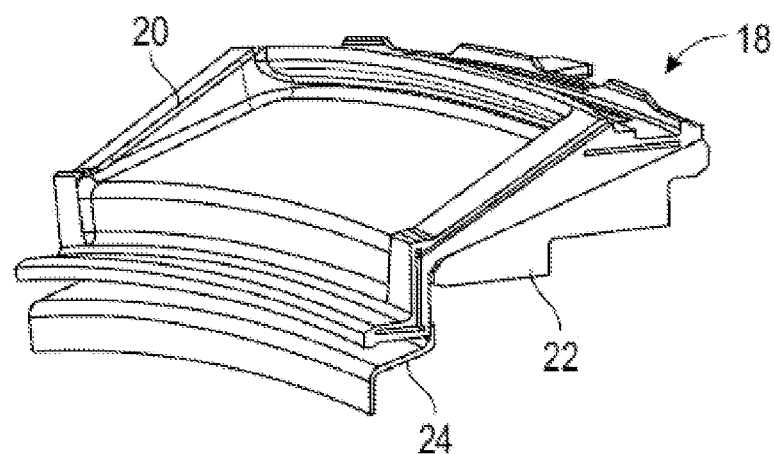
FIG. 2 is a schematic perspective view of a sealing ring sector according to the prior art.
Figure 3:
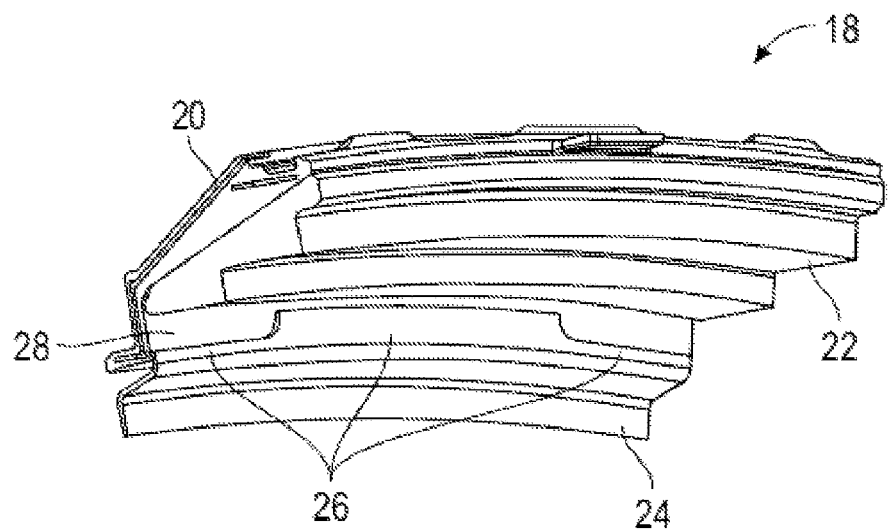
FIG. 3 is a further schematic perspective view of the ring sector of FIG. 2.

FIGS. 1 to 3 have been briefly described in the foregoing and illustrate the prior art of the present disclosure.

Figure 4:
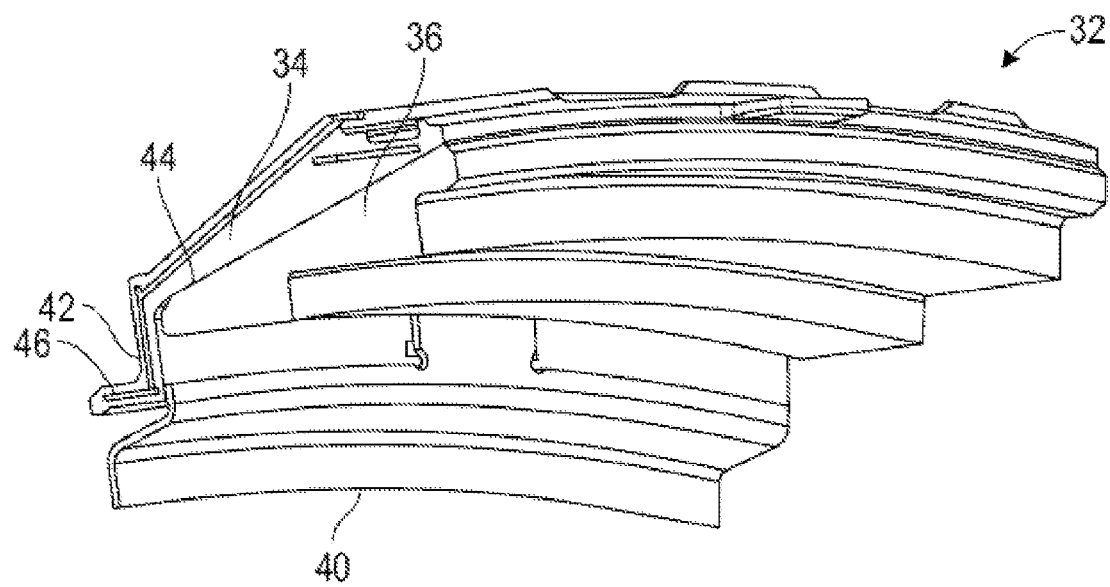
FIG. 4 is a schematic perspective view of a sealing ring sector according to the disclosure.

FIG. 4 and following illustrate an embodiment of a sealing ring according to the disclosure which may be fitted to a turbomachine or turbine 14 such as that shown in part in FIG. 1.

The turbine 14 of FIG. 1 is a low-pressure turbine of an aircraft turbomachine, this turbine comprising several stages each comprising a nozzle 28 formed by an annular row of fixed blades carried by the casing 16 of the turbine, and a blade wheel 30 mounted downstream of the nozzle 28 and rotating in a sealing ring 12 fastened to the casing 16.

The ring 12 is sectorised and formed of a plurality of sectors which are supported circumferentially end to end by the casing 16 of the turbine.

FIG. 4 and following show a ring sector 32 and it is understood that the sealing ring according to the disclosure comprises a plurality of such sectors 32.

Each ring sector 32 comprises a sector 34 of a cylindrical or frusto-conical support and a sector 36 of an annular coating made of abradable material brazed to the radially inner surface of the support sector 34. The coating sector 36 is of the honeycomb type and is intended to wear by friction on outer annular lips 38 of the blades of the wheel 30 to minimise radial clearances between the wheel and the ring sectors 32.

Each ring sector 32 further comprises a sector 40 of an annular thermal protection plate which is fastened to the support sector 34 by brazing.

Each support sector 34 comprises fastening elements and/or hooking elements configured to cooperate with the casing 16 and/or a nozzle 28.

Each support sector 34 comprises, for example, a sector of a first annular wall 42 extending substantially perpendicular to the axis of revolution of the ring. The outer periphery of this wall sector 42 is connected to a sector of a second cylindrical or frusto-conical wall 44 to the inner surface of which the coating sector 36 is fastened. The inner periphery of the wall sector 42 is connected to a sector 46 of a cylindrical fastening rim which extends axially upstream and may be axially engaged in an annular channel 48 of the casing 16, as seen in FIG. 1.

The ring sector 34 is thus secured at its upstream end to the casing 16 by means of this rim sector 46 which defines with the wall sector 42 an upstream end portion of L-shaped cross-section of the ring sector 32. At its downstream end, the wall sector 44 may comprise a channel 50 which opens radially outwards and in which a cylindrical hook 52 of the casing is engaged, as also seen in FIG. 1. The ring sector 34 is held radially against this hook 52 by means of the nozzle 28 located downstream. This nozzle 28 comprises a first upstream and internal cylindrical rim 54 which extends inside the ring sectors 32, and a second upstream and external cylindrical rim 56 which extends outside the ring sectors 32 and the hook 52.

Figure 6:
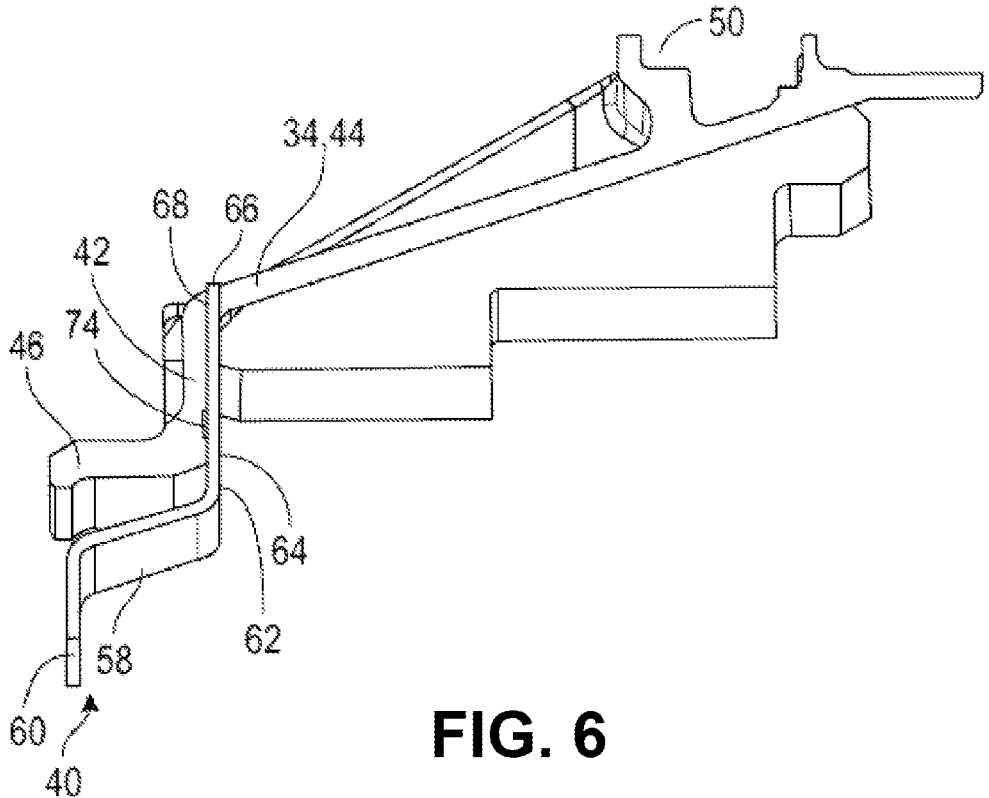
FIG. 6 is a schematic perspective and axial sectional view of the ring sector of FIG. 4.
Figure 7:
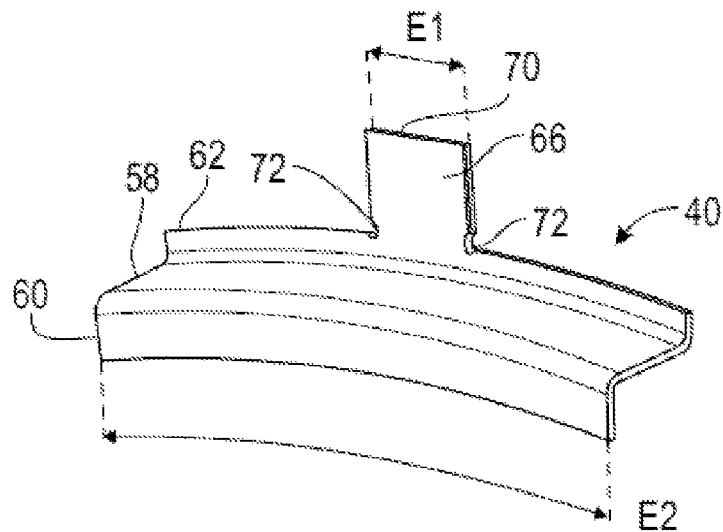
FIG. 7 is a schematic perspective view of a plate sector of the ring sector of FIG. 4.
Figure 8:
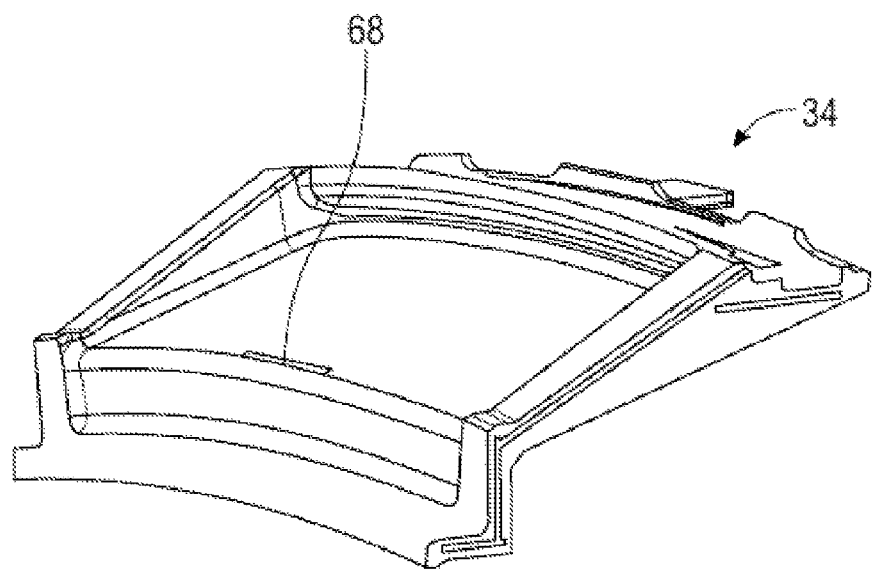
FIG. 8 is a schematic perspective view of a support sector of the ring sector of FIG. 4.

The plate sector 40 is generally S-shaped in axial section and comprises a median annular wall 58 connected to two annular rims 60, 62 extending substantially parallel in opposite directions (FIGS. 6 and 7). As can be seen in FIG. 1, the median wall 58 has a frustoconical orientation about the axis of revolution of the ring and is flared from upstream to downstream. The rims 60, 62 have substantially radial orientations with respect to this axis.

The wall 58 extends within and spaced from the rim sector 46 (FIG. 6) as well as from the portion 16a of the casing 16 (FIG. 1). The rim 60 extends radially inwards from the inner periphery of the wall 58 (FIG. 1) and also extends away from and here downstream of the portion 16a of the casing 16.

The rim 62 extends radially outwards from the outer periphery of the wall 58 and is pressed and brazed against the downstream radial face 64 of the wall sector 42 of the ring sector 32 (FIG. 6). Furthermore, this rim 62 comprises radially outward continuation forming a tab 66 which is inserted into and passes through a slot 68 formed in the wall sector 44 (FIG. 6).

The slot 68 is, for example, electro-eroded.

Figure 5:
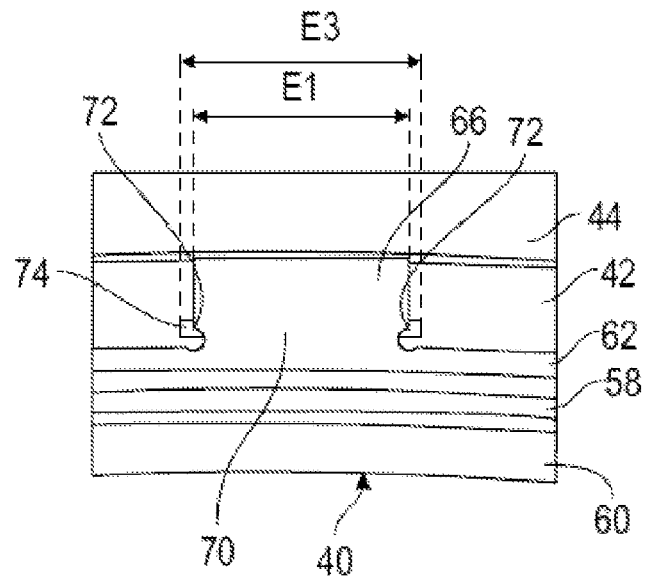
FIG. 5 is a larger scale view of a detail of FIG. 4.

In the example shown, the tab 66 is located in the middle of the plate sector 40 and its rim 62 (in the circumferential direction with respect to the aforementioned axis). The tab 66 is generally flat or planar in shape and rectangular in outline. It is connected to the rim 62 by a strip of material 70, forming a connection, the circumferential ends of which with respect to the aforementioned axis are arranged to limit the risk of stress concentration in operation (FIG. 5). In practice, these arrangements can be made by drilling holes 72 with a circular contour at the two circumferential ends of the strip 70. The side edges of the tab 66 are then connected by the circular edges of these holes 72 to the free edge of the rim 62.

The tab 66 of each plate sector 40 may have a circumferential extent E1 about the aforementioned axis which is at most 30% of the circumferential extent E2 of the plate sector 40 (FIG. 7).

The face 64 of the support sector 34 preferably comprises a groove 74 which extends tangentially or circumferentially with respect to the aforementioned axis and which is covered by the tab 66 and/or by the material strip 70 (FIG. 5). This groove 74 is configured to limit the spread of the braze by capillary action when the plate sector 40 is fastened to the support sector 34.

Figure 9:
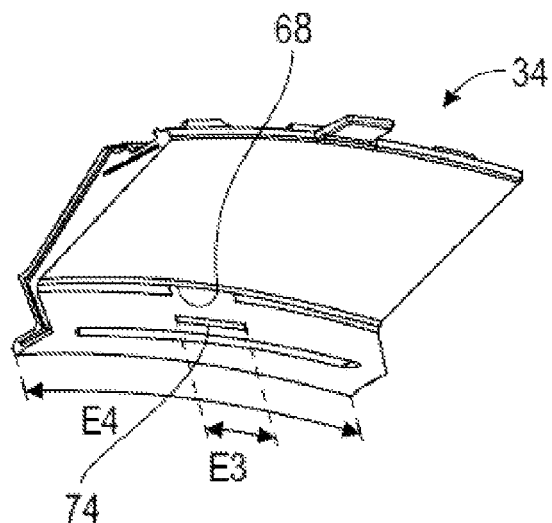
FIG. 9 is another schematic perspective view of the support sector of the ring sector of FIG. 4.
Figure 10:
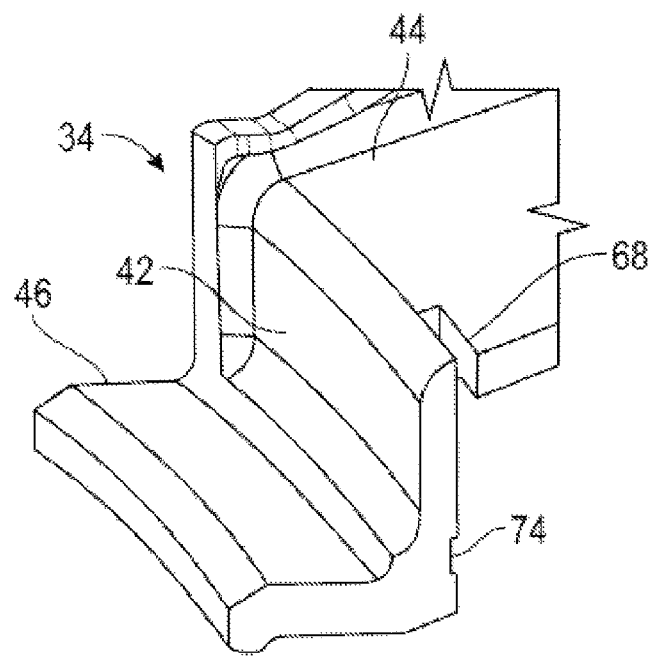
FIG. 10 is a schematic perspective and axial section view of the support sector of the ring sector of FIG. 4.
Figure 11:
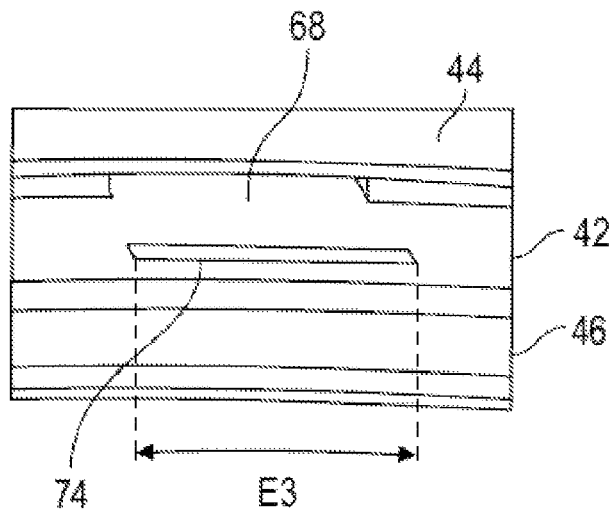
FIG. 11 is a larger scale view of a detail of FIG. 9.

The slot 68 has a general circumferential orientation about the axis and has a circumferential extent E3 representing at most 30% of the circumferential extent E4 of the support sector 34 (FIGS. 9 and 11).

In the example shown and preferred, E2 is equal to E4, and E1 is less than E3.

Figure 12:
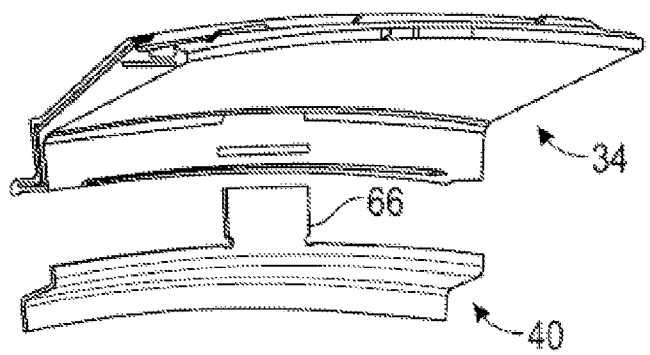
FIG. 12 is a schematic perspective view of the ring sector of FIG. 4 and illustrates.

The ring sector 32 according to the disclosure may be manufactured or assembled in the following manner. FIG. 12 illustrates a step in which the plate sector 40 is mounted on the support sector 34. The plate sector 40 is to be moved towards the support sector by translation in a plane containing the tab 66 and passing through the slot 68 of the support sector 34. Once the tab 66 of the plate sector 40 is in the slot 68, the coating sector 36 (not shown) can be attached to the support sector 34. The assembly is then heated to a predetermined temperature to melt the braze previously applied to the bearing surfaces of the parts. The tab 66 may be brazed to the face 64 in an area limited to the tab 66 and not extending beyond the groove 74. The coating sector 36 is brazed to the support sector 34 and can be supported or brazed to the tab 66 of the plate sector 40. Alternatively, the brazing operations could be replaced by welding operations.

The present disclosure has many advantages, in particular:
- limitation of the extent of the brazing through the groove, to stop its diffusion to the circumferential ends of the plate sector during the brazing operation;
- no connection between the circumferential ends of the plate sector and the support sector, which allows the two components to bend or unbend independently of each other without constraining each other;
- the brazed area has a significant total surface area, due to the possible brazing of the tab, despite the absence of brazing at the circumferential ends of the plate sector, and is concentrated in the centre of the part, and therefore not subject to much stress; this positioning is also beneficial as it is located in a less hot area; and
- the strength of the support sector-plate sector connection due to the embedding effect of the tab in the slot.

The invention claimed is:

1. A turbomachine sealing ring having an axis of revolution and comprising:
   an annular support which comprises fastening elements and/or hooking elements configured to cooperate with a stator element of the turbomachine,
   an annular coating made of abradable material which is secured to said support, and
   an annular thermal protection plate which is secured to said support,
   said ring being sectorised and comprising a plurality of ring sectors arranged circumferentially next to one another about said axis, each ring sector comprising a support sector, a coating sector and a plate sector, each plate sector comprising a flat tab pressed against a face of the corresponding support sector and fixed to this face by brazing,
   wherein said tab is inserted into a through-slot in said support sector in order to improve its integrity in operation,
   and wherein said coating bears on or is brazed to the tab of each plate sector.

2. The ring according to claim 1, wherein said support comprises a first annular wall extending perpendicular to said axis and the outer periphery of which is connected to a second cylindrical or frustoconical wall to which said coating is fixed, and the inner periphery of which is connected to a cylindrical fastening rim, said tab of each plate sector being applied against a free face of a sector of the first wall and inserted into a through-slot in the second wall of a sector.

3. The ring according to claim 2, wherein the plate is S-shaped in axial section and comprises a median annular wall connected to two annular rims extending in parallel in opposite directions, said tab of each plate sector extending in the continuation of one of the rims of that plate sector.

4. The ring according to claim 3, wherein said median wall of the plate extends away from and within said fastening rim of said support.

5. The ring according to claim 3, wherein the circumferential ends at the connection of said tab to the plate sector are arranged to limit the risk of stress concentration in operation.

6. The ring according to claim 1, wherein said face of the support sector comprises a groove which extends tangentially or circumferentially with respect to said axis and which is covered by said tab, this groove being configured to limit the spread of the braze when fastening the plate sector to the support sector.

7. The ring according to claim 1, wherein the tab of each plate sector is rectangular in shape and has a circumferential extent around said axis representing at most 30% of the circumferential extent of the plate sector.

8. The ring according to claim 1, wherein the slot of each support sector has a generally circumferential orientation about said axis and has a circumferential extent representing at most 30% of the circumferential extent of the support sector.

9. An aircraft turbomachine, comprising at least one ring according to claim 1.

10. A turbine, comprising at least one ring according to claim 1.

11. A turbomachine sealing ring having an axis of revolution and comprising:
    an annular support which comprises fastening elements and/or hooking elements configured to cooperate with a stator element of the turbomachine,
    an annular coating made of abradable material which is secured to said support, and
    an annular thermal protection plate which is secured to said support,
    said ring being sectorised and comprising a plurality of ring sectors arranged circumferentially next to one another about said axis, each ring sector comprising a support sector, a coating sector and a plate sector, each plate sector comprising a flat tab pressed against a face of the corresponding support sector and fixed to this face by brazing,
    wherein said tab is inserted into a through-slot in said support sector in order to improve its integrity in operation,
    and wherein said support comprises a first annular wall extending perpendicular to said axis and the outer periphery of which is connected to a second cylindrical or frustoconical wall to which said coating is fixed, and the inner periphery of which is connected to a cylindrical fastening rim, said tab of each plate sector being applied against a free face of a sector of the first wall and inserted into a through-slot in the second wall of a sector.

12. A turbomachine sealing ring having an axis of revolution and comprising:
    an annular support which comprises fastening elements and/or hooking elements configured to cooperate with a stator element of the turbomachine, an annular coating made of abradable material which is secured to said support, and an annular thermal protection plate which is secured to said support, said ring being sectorised and comprising a plurality of ring sectors arranged circumferentially next to one another about said axis, each ring sector comprising a support sector, a coating sector and a plate sector, each plate sector comprising a flat tab pressed against a face of the corresponding support sector and fixed to this face by brazing, wherein said tab is inserted into a through-slot in said support sector in order to improve its integrity in operation, and wherein the tab of each plate sector is rectangular in shape and has a circumferential extent around said axis representing at most 30% of the circumferential extent of the plate sector.

13. A turbomachine sealing ring having an axis of revolution and comprising:

an annular support which comprises fastening elements and/or hooking elements configured to cooperate with a stator element of the turbomachine, an annular coating made of abradable material which is secured to said support, and an annular thermal protection plate which is secured to said support, said ring being sectorised and comprising a plurality of ring sectors arranged circumferentially next to one another about said axis, each ring sector comprising a support sector, a coating sector and a plate sector, each plate sector comprising a flat tab pressed against a face of the corresponding support sector and fixed to this face by brazing, wherein said tab is inserted into a through-slot in said support sector in order to improve its integrity in operation, and wherein the slot of each support sector has a generally circumferential orientation about said axis and has a circumferential extent representing at most 30% of the circumferential extent of the support sector.

\* \* \* \* \*